(12) United States Patent
Yin et al.

(10) Patent No.: US 10,939,213 B2
(45) Date of Patent: Mar. 2, 2021

(54) BACKLIGHT ASSEMBLY, MANUFACTURING METHOD THEREOF AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Qingping Yin, Beijing (CN); Qian Wang, Beijing (CN); Jianan Wang, Beijing (CN); Tao Li, Beijing (CN)

(73) Assignees: BEIJING BOE DISPLAY TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/642,269

(22) PCT Filed: Mar. 1, 2019

(86) PCT No.: PCT/CN2019/076733
§ 371 (c)(1),
(2) Date: Feb. 26, 2020

(87) PCT Pub. No.: WO2019/174482
PCT Pub. Date: Sep. 19, 2019

(65) Prior Publication Data
US 2020/0260191 A1    Aug. 13, 2020

(30) Foreign Application Priority Data
Mar. 15, 2018    (CN) .......................... 201810215708.7

(51) Int. Cl.
H04R 17/00    (2006.01)
F21V 8/00    (2006.01)

(52) U.S. Cl.
CPC ........... *H04R 17/00* (2013.01); *G02B 6/0055* (2013.01); *G02B 6/0065* (2013.01); *G02B 6/0088* (2013.01); *H04R 2499/15* (2013.01)

(58) Field of Classification Search
CPC .. H04R 17/00; H04R 2499/15; G02B 6/0055; G02B 6/0065; G02B 6/0088
See application file for complete search history.

(56) References Cited

FOREIGN PATENT DOCUMENTS

CN    1678945 A    10/2005
CN    1900748 A    1/2007
(Continued)

OTHER PUBLICATIONS

First Office Action dated Feb. 3, 2020 for application No. CN201810215708.7 with English translation attached.
(Continued)

*Primary Examiner* — Joseph L Williams
(74) *Attorney, Agent, or Firm* — Nath, Goldberg & Meyer; Joshua B. Goldberg

(57) ABSTRACT

A backlight assembly, a method for manufacturing the same and a display device are provided. The backlight assembly includes: a light guide plate having a first surface and a second surface opposite to each other, a reflective layer at a position adjacent to the first surface of the light guide plate, and a piezoelectric unit on a surface of the reflective layer distal to the light guide plate. The piezoelectric unit is configured to undergo deformation in a direction close to the first surface and in a direction away from the first surface according to an audio voltage applied to the piezoelectric unit, and drive the reflective layer to undergo deformation to emit a sound.

20 Claims, 2 Drawing Sheets

(56) References Cited

FOREIGN PATENT DOCUMENTS

| | | |
|---|---|---|
| CN | 101273660 A | 9/2008 |
| CN | 103852927 A | 6/2014 |
| JP | 2010003582 A | 1/2010 |
| WO | 2015194476 A1 | 12/2015 |

OTHER PUBLICATIONS

Second Office Action issued on Jul. 20, 2020 for application No. CN201810215708.7 with English translation attached.

BACKLIGHT ASSEMBLY, MANUFACTURING METHOD THEREOF AND DISPLAY DEVICE

CROSS REFERENCE TO RELATED APPLICATIONS

This is a National Phase Application filed under 35 U.S.C. 371 as a national stage of PCT/CN2019/076733, filed Mar. 1, 2019, an application claiming the benefit of Chinese Application No. 201810215708.7, filed Mar. 15, 2018, the content of each of which is hereby incorporated by reference in its entirety.

TECHNICAL FIELD

The present disclosure relates to the field of display technology, and in particular to a backlight assembly, a method for manufacturing the same, and a display device.

BACKGROUND

With the development of display technology, liquid crystal display (LCD) devices have been widely used in various fields. Each of the liquid crystal display devices may include a backlight assembly and a display assembly. In a conventional LCD device, the backlight assembly only provides the display assembly with light required for normal display.

SUMMARY

Embodiments of the present disclosure provide a backlight assembly, a method for manufacturing a backlight assembly, and a display device.

Some embodiments of the present disclosure provide a backlight assembly, including:
a light guide plate having a first surface and a second surface opposite to each other;
a reflective layer at a position adjacent to the first surface of the light guide plate; and
a piezoelectric unit on a surface of the reflective layer distal to the light guide plate;
wherein the piezoelectric unit is configured to undergo deformation in a direction close to the first surface and in a direction away from the first surface according to an audio voltage applied to the piezoelectric unit, and drive the reflective layer to undergo deformation to emit a sound.

In an embodiment, the backlight assembly further includes fixing components for fixing both ends of the reflective layer in a direction parallel to the first surface.

In an embodiment, the backlight assembly further includes conductive terminals at both ends of the piezoelectric unit in a direction parallel to the first surface; and
signal input lines connected to the conductive terminals, respectively;
wherein the signal input lines are configured to apply the audio voltage to the piezoelectric unit through the conductive terminals, respectively.

In an embodiment, a material of each of the conductive terminals includes silver.

In an embodiment, the piezoelectric unit includes at least one piezoelectric ceramic sheet.

In an embodiment, the piezoelectric unit includes a plurality of piezoelectric ceramic sheets, and the plurality of piezoelectric ceramic sheets are stacked on each other in a direction perpendicular to the first surface.

In an embodiment, the backlight assembly further includes a light source on a side of the light guide plate substantially perpendicular to the first surface.

In an embodiment, the side is a light incident side of the light guide plate, and the second surface is a light exit surface of the light guide plate.

In an embodiment, the backlight assembly further includes an air gap between the light guide plate and the reflective layer.

In an embodiment, each of the fixing components includes one of an adhesive tape and a clamp.

Some embodiments of the present disclosure provide a display device, which includes the backlight assembly according to any one of foregoing embodiments of the present disclosure.

In an embodiment, the display device further includes a back frame for fixing the piezoelectric unit.

In an embodiment, both ends of the reflective layer in a direction parallel to the first surface are fixed to the back frame by at least two fixing components, respectively.

In an embodiment, the display device further includes a display panel on the second surface of the backlight assembly.

In an embodiment, the display device further includes a voltage supply circuit configured to supply the audio voltage to the piezoelectric unit and supply a gray-scale voltage to the display panel to display a picture.

In an embodiment, the voltage supply circuit includes a controller, an audio voltage supply sub-circuit, and a gray-scale voltage supply sub-circuit, wherein
the controller is configured to control the audio voltage supply sub-circuit and the gray-scale voltage supply sub-circuit to operate synchronously;
the audio voltage supply sub-circuit is configured to output the audio voltage to the piezoelectric unit for sound emission; and
the gray-scale voltage supply sub-circuit is configured to output the gray-scale voltage to the display panel.

Some embodiments of the present disclosure provide a method for manufacturing a backlight assembly, including preparing a light guide plate, wherein the light guide plate has a first surface and a second surface opposite to each other;
disposing a reflective layer at a position adjacent to the first surface of the light guide plate; and
forming a piezoelectric unit on a surface of the reflective layer distal to the light guide plate, wherein the piezoelectric unit is configured to undergo deformation in a direction close to the first surface and in a direction away from the first surface according to an audio voltage applied to the piezoelectric unit, and drive the reflective layer to undergo deformation to emit a sound.

In an embodiment, the method further includes fixing both ends of the reflective layer in a direction parallel to the first surface by using fixing components, respectively.

In an embodiment, the method further includes arranging conductive terminals at both ends of the piezoelectric unit in a direction parallel to the first surface, respectively; and
connecting signal input lines to the conductive terminals, respectively;
wherein the signal input lines are configured to apply the audio voltage to the piezoelectric unit through the conductive terminals, respectively.

In an embodiment, the forming a piezoelectric unit on a surface of the reflective layer distal to the light guide plate includes: forming at least one piezoelectric ceramic sheet on the surface of the reflective layer distal to the light guide plate.

DETAILED DESCRIPTION

To enable one of ordinary skill in the art to better understand the technical solutions of the present disclosure, the present disclosure will be further described in detail below with reference to the accompanying drawings and exemplary embodiments.

A display assembly of a conventional liquid crystal display device may include an array substrate, a color film substrate, and a liquid crystal layer disposed between the array substrate and the color film substrate. In addition, a lower polarizer may be provided at a light incident side of the array substrate, and an upper polarizer may be provided at a light exit side of the color film substrate. A polarization direction of the upper polarizer and a polarization direction of the lower polarizer are generally perpendicular to each other.

Light from the backlight assembly is converted into linearly polarized light after passing through the lower polarizer at the light incident side of the array substrate, and then the linearly polarized light is incident into the liquid crystal layer. In the case where different electric fields are applied to liquid crystal molecules in different portions of the liquid crystal layer, the liquid crystal molecules in the portions will undergo different rotations. The different rotations of the liquid crystal molecules will cause the polarization direction of the linearly polarized light to undergo different deflections, such that transmittances of the linearly polarized light are different when the linearly polarized light passes through the upper polarizer at the light exit side of the color film substrate. Therefore, brightnesses of lights emitted from different positions of the array substrate are different, such that different positions on a light exit surface of the liquid crystal display device display colors with different gray scales.

With the development of liquid crystal display devices, people have increasingly high requirements on the quality of the liquid crystal display devices. Further, it is desirable that an integration level, an intelligence level, and the like of a liquid crystal display device are further increased.

Figure 1:
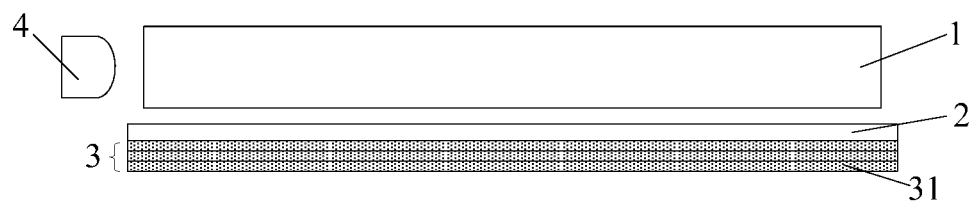
FIG. 1 is a schematic view of a backlight assembly according to an embodiment of the present disclosure.

An embodiment of the present disclosure provides a backlight assembly, which may be a side-entry backlight assembly, as shown in FIG. 1. The backlight assembly may include a light guide plate 1, a reflective layer 2, a piezoelectric unit 3, and a light source 4 positioned at a side of the light guide plate 1 (e.g., a left side of the light guide plate 1 shown in FIG. 1). In the backlight assembly, the light guide plate 1 has a first surface (e.g., a lower surface shown in FIG. 1) and a second surface (e.g., an upper surface shown in FIG. 1) opposite to each other. In an embodiment, the second surface may be a light exit surface of the light guide plate 1. The reflective layer 2 is disposed adjacent to the first surface of the light guide plate 1. In an embodiment, an air gap is provided between the light guide plate 1 and the reflective layer 2, and provides a space for vibration of the reflective layer 2 and the piezoelectric unit 3, as will be further described below. The piezoelectric unit 3 is arranged on a surface of the reflective layer 2 distal to the light guide plate 1. The piezoelectric unit 3 is configured to undergo deformation in a direction close to the first surface and a direction away from the first surface according to an audio voltage (which may be also referred to as an audio signal) applied to the piezoelectric unit 3, and drive the reflective layer 2 to deform so as to generate a sound. In other words, the piezoelectric unit 3 is configured to undergo deformation in a direction substantially perpendicular to the first surface according to an audio voltage (which may be also referred to as an audio signal and may be a non-constant voltage or even an alternating voltage) applied to the piezoelectric unit 3, and drive the reflective layer 2 to deform in the direction substantially perpendicular to the first surface so as to generate a sound. It should be understood that the "side-entry backlight assembly" refers to a backlight assembly in which the light source is located on a side (e.g., lateral side) of the light guide plate substantially perpendicular to the light exit surface. For example, in the side-entry backlight assembly shown in FIG. 1, the light source 4 is located on a side (e.g., the left side shown in FIG. 1) of the light guide plate 1 substantially perpendicular to the light exit surface (the second surface, i.e., the upper surface shown in FIG. 1). The light guide plate 1 may be a conventional light guide plate, and the reflective layer 2 may be a conventional reflective layer.

It should be noted that, the piezoelectric unit 3 generally undergoes deformation in the direction close to the first surface and the direction away from the first surface according to an audio voltage applied to the piezoelectric unit 3, and drives the reflective layer 2 to undergo the same deformation, so as to generate resonance for sound emission. However, the present disclosure is not limited thereto. For example, the piezoelectric unit 3 may be configured to undergo deformation in a first direction according to an audio voltage applied to the piezoelectric unit 3, to drive the reflective layer 2 to undergo the same deformation so as to resonate to generate a sound, and the first direction may be perpendicular to the plan view shown in FIG. 1 or be other different directions.

In the backlight assembly according to the present embodiment, the piezoelectric unit 3 is disposed adjacent to the first surface of the light guide plate 1, and the piezoelectric unit 3 is configured to undergo deformation along the direction close to the first surface and the direction away from the first surface according to an audio voltage applied to the piezoelectric unit 3, and drive the reflective layer 2 to undergo the same deformation to generate a sound. That is, the backlight assembly according to the present embodiment is integrated with a piezoelectric speaker (i.e., the reflective layer 2 and the piezoelectric unit 3 as a whole serve as the piezoelectric speaker) therein, and the piezoelectric unit 3 drives the reflective layer 2 to vibrate. In this way, the reflective layer 2 not only has a reflecting effect on light to improve the utilization of light emitted from the light source 4, but also serves as a vibrating diaphragm of the piezoelectric speaker. Therefore, an integration degree of the backlight assembly according to the present embodiment is greatly improved compared with a conventional backlight assembly. Further, if the backlight assembly is applied to a display device, a separate speaker may be omitted. As such, the effects of simple structure and cost reduction of the display device can be achieved.

The piezoelectric unit 3 may be made of a piezoelectric material (e.g., piezoelectric ceramic). The piezoelectric unit 3 made of a piezoelectric material has a piezoelectric effect and an inverse piezoelectric effect. The piezoelectric effect means that when an external force is applied to the piezoelectric unit 3 in a polarization direction of the piezoelectric unit 3, a polarization phenomenon occurs inside the piezoelectric unit 3, and thus charges of opposite polarities appear on two opposite surfaces of the piezoelectric unit 3 in the polarization direction. When the external force is removed, the piezoelectric unit 3 returns to the uncharged state. As the direction of the external force changes by 180 degrees, the polarities of the electric charges appearing on the two opposite surfaces of the piezoelectric unit 3 along the polarization direction also change. The inverse piezoelectric effect means that when an electric field is applied to the piezoelectric unit 3 in the polarization direction of the piezoelectric unit 3, the piezoelectric unit 3 undergoes deformation, and the deformation of the piezoelectric unit 3 disappears after the electric field is removed.

Figure 2:
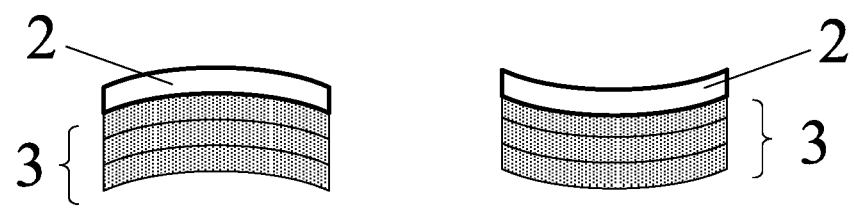
FIG. 2 is a schematic diagram illustrating deformation of a piezoelectric unit and a reflective layer of a backlight assembly according to an embodiment of the present disclosure.

FIG. 2 is a schematic diagram illustrating deformation of the piezoelectric unit 3 and the reflective layer 2 of the backlight assembly shown in FIG. 1. For example, the left part of FIG. 2 shows a schematic view in which the piezoelectric unit 3 and the reflective layer 2 are upwardly convex due to deformation (elongation) in the case where the left end of the piezoelectric unit 3 is connected to a positive voltage and the right end of the piezoelectric unit 3 is connected to a negative voltage. The right part of FIG. 2 shows a schematic view in which the piezoelectric unit 3 and the reflective layer 2 are depressed downwards due to deformation (contraction) in the case where the left end of the piezoelectric unit 3 is connected to a negative voltage and the right end of the piezoelectric unit 3 is connected to a positive voltage.

It should be noted that, when the piezoelectric unit 3 undergoes deformation according to the audio voltage applied thereto and drives the reflective layer 2 to undergo deformation in the same way, the deformation is not very large. Further, the light reflected by the reflective layer enters a display panel including the backlight assembly after being subjected to the light homogenization function of the light guide plate 1. Therefore, the deformation of the reflective layer 2 does not have a significantly influence on an exit direction of the reflected light in the backlight assembly, and the effect on normal display of the display panel may be negligible.

Figure 4:
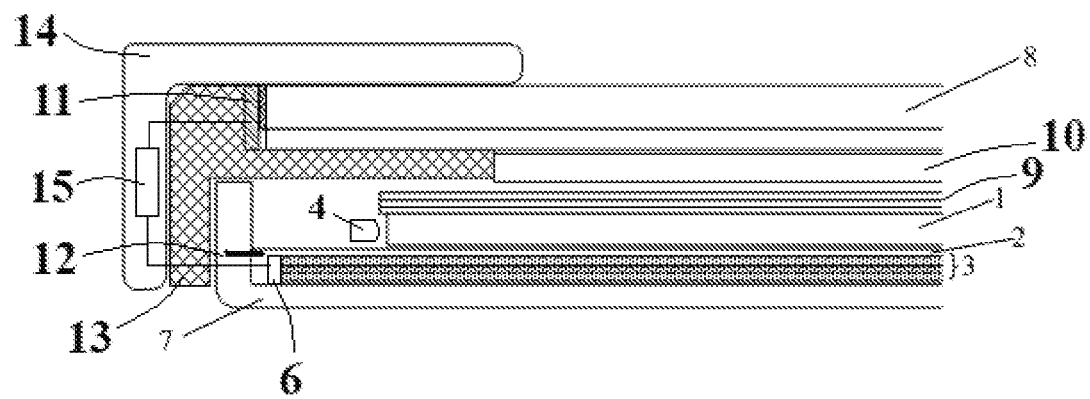
FIG. 4 is a schematic diagram showing a structure of a display device according to an embodiment of the present disclosure.
Figure 5:
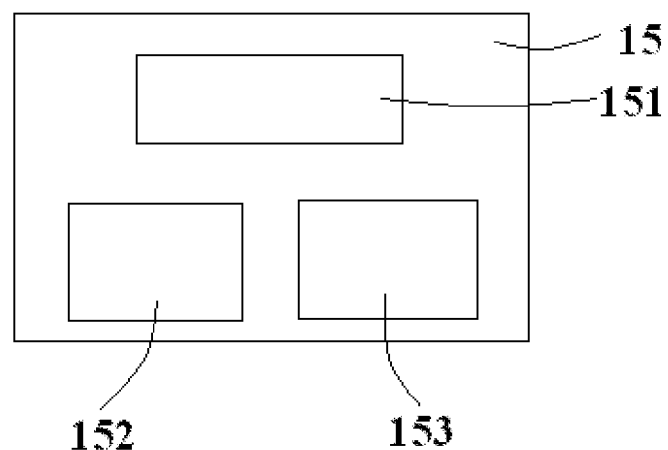
FIG. 5 is a schematic diagram showing a structure of a voltage supply circuit of a display device according to an embodiment of the present disclosure.

In an embodiment, the backlight assembly further includes fixing components 12 (as shown in FIG. 4) for fixing two ends of the reflective layer 2 in a direction parallel to the first surface (e.g., the left and right ends of the reflective layer 2 shown in FIG. 1), such that the reflective layer 2 may be disposed to be flat and the reflective layer 2 is prevented from moving freely during sound emission. As such, it is guaranteed that the piezoelectric unit 3 undergoes deformation according to an audio voltage applied to the piezoelectric unit 3, to drive the reflective layer 2 to undergo the same deformation, thereby generating a sound accurately. In an embodiment, each of the fixing components 12 may be an adhesive tape or a clamp, and the clamp may be made of plastic and formed by a molding process. In an embodiment, the backlight assembly may further include a back frame 7 (as shown in FIG. 4), and the back frame 7 may support the light guide plate 1, the reflective layer 2 and the piezoelectric unit 3. Alternatively, the back frame 7 may be included in a display device as described below. In an embodiment, two fixing components 12 may be used for fixing both ends of the reflective layer 2 in the direction parallel to the first surface to the back frame 7.

Figure 3:
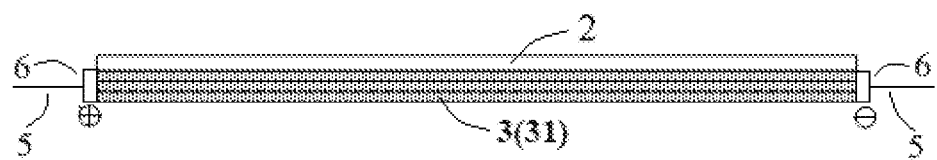
FIG. 3 is a schematic diagram of a piezoelectric unit and a reflective layer of a backlight assembly according to an embodiment of the present disclosure.

In an embodiment, as shown in FIG. 3, the backlight assembly may further include a plurality of (e.g., two) conductive terminals 6 and a plurality of (e.g., two) signal input lines 5. The plurality of conductive terminals 6 are provided at both ends (e.g., left and right ends as shown in FIG. 3) of the piezoelectric unit 3, respectively, and the plurality of signal input lines 5 are connected to the plurality of conductive terminals 6, respectively. As shown in FIG. 3, the conductive terminal 6 labeled with the reference sign "⊕" indicates a positive conductive terminal, and the conductive terminal 6 labeled with the reference sign "⊖" indicates a negative conductive terminal. However, the present disclosure is not limited thereto. For example, the position of the positive conductive terminal 6 and the position of the negative conductive terminal 6 may be interchanged. The plurality of signal input lines 5 may be used for applying an audio voltage to the piezoelectric unit 3 through the respective conductive terminals 6. In an embodiment, a material of each of the conductive terminals 6 may be silver. However, the present disclosure is not limited thereto. For example, the material of the conductive terminal 6 may be selected from other materials having high electric conductivity.

In an embodiment, the piezoelectric unit 3 may include at least one piezoelectric ceramic sheet 31. In an embodiment, to make an amplitude of the vibration of the piezoelectric unit 3 larger so as to drive the reflective layer 2 to emit a sound with a higher volume, the piezoelectric unit 3 may include a plurality of piezoelectric ceramic sheets 31, and the plurality of piezoelectric ceramic sheets 31 are stacked on each other in the direction perpendicular to the first surface (or the light exit surface). In other words, the plurality of piezoelectric ceramic sheets 31 are disposed parallel to the first surface or the second surface of the light guide plate 1. In an embodiment, the plurality of piezoelectric ceramic sheets 31 may be identical to each another, and each of the piezoelectric ceramic sheets 31 may be a commercially available piezoelectric ceramic sheet on the market. In an embodiment, each of the piezoelectric ceramic sheets 31 may have a shape (e.g., rectangle) similar to a shape of the reflective layer 2. As an example, for a display device of about 8 inches, 12 piezoelectric ceramic sheets 31 may be employed to generate sounds, each of the piezoelectric ceramic plates 31 has a hexahedral shape (or a shape of hexahedron), and may have a length of about 105.3 mm and a width of about 4.79 mm in a direction parallel to the first surface and a thickness of about 0.54 mm in a direction perpendicular to the first surface. Further, in this example, each of the piezoelectric ceramic sheets 31 may have optoelectronic parameters such as a resonant frequency of about $2.2\pm0.4$ kHz, a resonant resistance less than or equal to about 200 ohms, a capacitance of about $50{,}000\pm30\%$ pF, etc. It should be understood that the piezoelectric unit 3 is not limited to the piezoelectric ceramic sheets 31 and the above-described examples. For example, the piezoelectric unit 3 may include other different-structured material layers that undergo different deformations to vibrate according to voltages applied thereto.

As shown in FIG. 4, an embodiment of the present disclosure provides a display device, which includes a backlight assembly that may be the backlight assembly provided by any one of the foregoing embodiments of the present disclosure. As such, the backlight assembly serves as not only a backlight source of the display device, but also a speaker of the display device. Therefore, a separate speaker for the display device may be omitted, thereby making the structure of the display device simple and the cost of the display device low.

In this embodiment, the back frame 7 for fixing the reflective layer 2 of the backlight assembly according to the foregoing embodiments may also be used as a back frame of the display device. That is, as described above, both ends of the reflective layer 2 may be fixed to the back frame 7 of the display device, and the structure of the display device is therefore further simplified.

In an embodiment, the display device further includes a display panel (e.g., a liquid crystal display panel) 8 disposed on the light exit surface of the light guide plate 1. In an embodiment, the display panel may include conductive lines 11, and the conductive lines 11 are used for receiving gray scale signals required for normal display of the display panel.

In an embodiment, the display device may further include a voltage supply circuit 15, and the voltage supply circuit 15 may be connected to the conductive terminals 6 of the backlight assembly and the conductive lines 11 of the display panel. The voltage supply circuit 15 may supply the audio voltage to the piezoelectric unit 3 and supply a corresponding gray-scale voltage to the display panel 8. In an embodiment, the voltage supply circuit 15 includes a controller 151, an audio voltage supply sub-circuit 152, and a gray-scale voltage supply sub-circuit 153. The audio voltage supply sub-circuit 152 may output an audio voltage to the piezoelectric unit 3 under the control of the controller 151 to generate a sound, and the gray-scale voltage supply sub-circuit 153 may output a gray-scale voltage to the display panel 8 under the control of the controller 151 to display a picture. In an embodiment, the controller 151 may be a microprocessor, a digital signal processor, or a central processing unit (CPU). The audio voltage supply sub-circuit 152 may be an integrated circuit (IC) having the functions described herein, and the gray-scale voltage supply sub-circuit 153 may be an integrated circuit (IC) having the functions described herein. The controller 151 may control the audio voltage supply sub-circuit 152 and the gray-scale voltage supply sub-circuit 153 to operate simultaneously, so as to emit a sound and display a picture synchronously. In this way, the display effect may be more realistic. For example, a sound may be emitted from the mouth of the displayed character (e.g., person), and a position from which a sound is emitted may move as an entity emitting the sound moves.

In an embodiment, the display device may further include an optical film (e.g., a diffusion film) 9, and the optical film 9 is located between the backlight assembly and the display panel 8. For example, the optical film 9 is located on the light exit surface (i.e., the second surface) of the light guide plate 1 for making the light from the light guide plate 1 more uniform.

In an embodiment, the display device may further include a spacer 10, and the spacer 10 may space the optical film 9 apart from the display panel 8 and may support the display panel 8.

In an embodiment, the display device may further include a plastic frame 13 and a front frame 14, and the plastic frame 13 and the front frame 14 may assemble the respective components of the display device together. The plastic frame 13 and the front frame 14 may be conventional components. In an embodiment, the voltage supply circuit 15 may be provided in the front frame 14. However, the present disclosure is not limited thereto. For example, the voltage supply circuit 15 may be disposed in the plastic frame 13 or outside the display device.

In an embodiment, the display device may include a liquid crystal display device, for example, any product or component with a display function such as a liquid crystal panel, electronic paper, a mobile phone, a tablet computer, a television, a display, a notebook computer, a digital photo frame, a navigator, and/or the like.

In the display device according to the present embodiment of the present disclosure, the backlight assembly may not only provide light required for normal display of the display panel, but also be integrated with the piezoelectric speaker. Therefore, the display device has a higher integration degree, a simpler structure, and a lower cost. In addition, the display effect of the display device can be more vivid. For example, a sound may be emitted from the mouth of the displayed character (e.g., person), and a position from which a sound is emitted may move as the entity emitting the sound moves.

An embodiment of the present disclosure provides a method for manufacturing a backlight assembly. Referring to FIGS. 1 to 4, the method may include the following steps S1 to S3.

Step S1 may include preparing a light guide plate 1, wherein the light guide plate 1 has a first surface (e.g., the lower surface shown in FIG. 1) and a second surface (e.g., the upper surface shown in FIG. 1) opposite to each other.

Step S2 may include disposing a reflective layer 2 such that the reflective layer 2 is at a position close (or adjacent) to the first surface of the light guide plate 1. For example, an air gap may be present between the reflective layer 2 and the light guide plate 1 to provide a space for deformation of the reflective layer 2 and the light guide plate 1 in a direction substantially perpendicular to the first surface.

Step S3 includes forming a piezoelectric unit 3 on a surface of the reflective layer 2 distal to the light guide plate 1, wherein the piezoelectric unit 3 is configured to undergo deformation in a direction close to the first surface and in a direction away from the first surface according to an audio voltage applied to the piezoelectric unit 3, and drive the reflective layer to undergo deformation to generate (or emit) a sound.

In an embodiment, the method may further include the following step S4.

Step S4 may include fixing both ends of the reflective layer 2 in a direction parallel to the first surface by using fixing components 12 (shown in FIG. 4).

In an embodiment, the method may further include the following step S5.

Step S5 may include providing conductive terminals 6 at both ends of the piezoelectric unit 3 in the direction parallel to the first surface, respectively. In addition, step S5 may further include connecting the signal input lines 5 to the conductive terminals 6, respectively, as shown in FIG. 3.

The signal input lines 5 may apply an audio voltage to the piezoelectric unit 3 through the conductive terminals 6.

In an embodiment, the step of forming the piezoelectric unit on the surface of the reflective layer distal to the light guide plate (i.e., step S3) may include: forming at least one piezoelectric ceramic sheet 31 on the surface of the reflective layer 2 distal to the light guide plate 1, as shown in FIG. 1.

In other embodiments, the method may further include other steps for forming corresponding structures of the backlight assembly described above. For example, the method may further include a step of providing the light source 4 at a side (e.g., the left side shown in FIG. 1) of the light guide plate 1.

The backlight assembly manufactured by the method according to the present embodiment of the present disclosure can not only provide light required by normal display of the display panel, but also include the piezoelectric speaker. Therefore, the backlight assembly has a higher integration level, a simpler structure and a lower cost.

The embodiments described above may be combined with each other without explicit conflict.

It is to be understood that the above embodiments are merely exemplary embodiments for explaining the principle of the present disclosure, and that the present disclosure is not limited thereto. It will be apparent to one of ordinary skill in the art that various changes and modifications can be made therein without departing from the spirit and essence of the present disclosure, and these changes and modifications also fall within the scope of the present disclosure.

What is claimed is:

1. A backlight assembly, comprising
   a light guide plate having a first surface and a second surface opposite to each other;
   a reflective layer at a position adjacent to the first surface of the light guide plate; and
   a piezoelectric unit on a surface of the reflective layer distal to the light guide plate;
   wherein the piezoelectric unit is configured to undergo deformation in a direction close to the first surface and in a direction away from the first surface according to an audio voltage applied to the piezoelectric unit, and drive the reflective layer to undergo deformation to emit a sound.

2. The backlight assembly according to claim 1, further comprising
   fixing components for fixing both ends of the reflective layer in a direction parallel to the first surface.

3. The backlight assembly according to claim 1, further comprising
   conductive terminals at both ends of the piezoelectric unit in a direction parallel to the first surface; and
   signal input lines connected to the conductive terminals, respectively;
   wherein the signal input lines are configured to apply the audio voltage to the piezoelectric unit through the conductive terminals, respectively.

4. The backlight assembly according to claim 3, wherein a material of each of the conductive terminals comprises silver.

5. The backlight assembly according to claim 1, wherein the piezoelectric unit comprises at least one piezoelectric ceramic sheet.

6. The backlight assembly according to claim 5, wherein the piezoelectric unit comprises a plurality of piezoelectric ceramic sheets, and the plurality of piezoelectric ceramic sheets are stacked on each other in a direction perpendicular to the first surface.

7. The backlight assembly according to claim 1, further comprising
   a light source on a side of the light guide plate substantially perpendicular to the first surface.

8. The backlight assembly according to claim 7, wherein the side is a light incident side of the light guide plate, and the second surface is a light exit surface of the light guide plate.

9. The backlight assembly according to claim 1, further comprising an air gap between the light guide plate and the reflective layer.

10. The backlight assembly according to claim 2, wherein each of the fixing components comprises one of an adhesive tape and a clamp.

11. A display device, comprising the backlight assembly according to claim 1.

12. The display device according to claim 11, further comprising
    a back frame for fixing the piezoelectric unit.

13. The display device according to claim 12, wherein both ends of the reflective layer in a direction parallel to the first surface are fixed to the back frame by at least two fixing components, respectively.

14. The display device according to claim 11, further comprising
    a display panel on the second surface of the backlight assembly.

15. The display device according to claim 14, further comprising
    a voltage supply circuit configured to supply the audio voltage to the piezoelectric unit and supply a gray-scale voltage to the display panel to display a picture.

16. The display device according to claim 15, wherein the voltage supply circuit comprises a controller, an audio voltage supply sub-circuit, and a gray-scale voltage supply sub-circuit, wherein
    the controller is configured to control the audio voltage supply sub-circuit and the gray-scale voltage supply sub-circuit to operate synchronously;
    the audio voltage supply sub-circuit is configured to output the audio voltage to the piezoelectric unit for sound emission; and
    the gray-scale voltage supply sub-circuit is configured to output the gray-scale voltage to the display panel.

17. A method for manufacturing a backlight assembly, comprising
    preparing a light guide plate, wherein the light guide plate has a first surface and a second surface opposite to each other;
    disposing a reflective layer at a position adjacent to the first surface of the light guide plate; and
    forming a piezoelectric unit on a surface of the reflective layer distal to the light guide plate, wherein the piezoelectric unit is configured to undergo deformation in a direction close to the first surface and in a direction away from the first surface according to an audio voltage applied to the piezoelectric unit, and drive the reflective layer to undergo deformation to emit a sound.

18. The method according to claim 17, further comprising
    fixing both ends of the reflective layer in a direction parallel to the first surface by using fixing components, respectively.

19. The method according to claim 17, further comprising
arranging conductive terminals at both ends of the piezoelectric unit in a direction parallel to the first surface, respectively; and connecting signal input lines to the conductive terminals, respectively;

wherein the signal input lines are configured to apply the audio voltage to the piezoelectric unit through the conductive terminals, respectively.

20. The method according to claim 17, wherein the forming a piezoelectric unit on a surface of the reflective layer distal to the light guide plate comprises: forming at least one piezoelectric ceramic sheet on the surface of the reflective layer distal to the light guide plate.

\* \* \* \* \*